US012628251B2

(12) United States Patent
Kim

(10) Patent No.: US 12,628,251 B2
(45) Date of Patent: May 12, 2026

(54) LAMP SYSTEM FOR VEHICLE

(71) Applicant: HYUNDAI MOBIS CO., LTD., Seoul (KR)

(72) Inventor: Myeong Je Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 143 days.

(21) Appl. No.: 18/587,436

(22) Filed: Feb. 26, 2024

(65) Prior Publication Data

US 2025/0031289 A1 Jan. 23, 2025

(30) Foreign Application Priority Data

Jul. 18, 2023 (KR) ........................ 10-2023-0092797

(51) Int. Cl.

*H05B 45/325* (2020.01)
*F21S 41/141* (2018.01)
*F21S 45/43* (2018.01)

(52) U.S. Cl.

CPC .......... *H05B 45/325* (2020.01); *F21S 41/141* (2018.01); *F21S 45/43* (2018.01)

(58) Field of Classification Search

CPC ...... H05B 45/325; F21S 41/141; F21S 45/43; B60Q 1/0088; B60R 16/023
See application file for complete search history.

(56) References Cited

U.S. PATENT DOCUMENTS

2015/0373796 A1* 12/2015 Bahrehmand ........ H05B 47/115 315/129
2017/0285699 A1* 10/2017 Ahuja ..................... G06F 1/206
2020/0278108 A1* 9/2020 Saito ........................ G03B 7/22
2021/0400789 A1* 12/2021 Palliyil Chundethodiyil ............. H05B 45/355
2022/0102966 A1* 3/2022 Tan ...................... G01R 31/006

FOREIGN PATENT DOCUMENTS

KR 10-1827706 B1 2/2018

* cited by examiner

*Primary Examiner* — Abdullah A Riyami
*Assistant Examiner* — Syed M Kaiser
(74) *Attorney, Agent, or Firm* — NSIP Law

(57) ABSTRACT

A lamp system for a vehicle including an optical output unit including a light source drive unit, a reception unit, and a power supply unit configured to supply power to an electrical load unit and the optical output unit, one or more processors configured to execute instructions and a memory storing the instructions which configure the processors to generate the integrated control signal for controlling one or more of the electrical load unit and the optical output unit and a transmission unit providing the integrated control signal to the reception unit, the reception unit being configured to provide a pulse width modulation (PWM) signal for power control to the power supply unit based on the received integrated control signal, and the power supply unit variably supplies power to the electrical load unit and the light source drive unit based on the PWM signal.

12 Claims, 12 Drawing Sheets

LAMP SYSTEM FOR VEHICLE

CROSS-REFERENCE TO RELATED APPLICATIONS

This application claims the benefit under 35 U.S.C. § 119(a) of Korean Patent Application No. 10-2023-0092797, filed on Jul. 18, 2023, in the Korean Intellectual Property Office, the entire disclosure of which is incorporated herein by reference in its entirety.

1. FIELD

The following disclosure relates to a lamp system, and more particularly, to a lamp system for a vehicle.

2. DESCRIPTION OF THE RELATED ART

In the recent development of an automobile headlamp, the development of an intelligent headlamp with a large emphasis on safety is actively progressing around the world, and the automobile headlamp has been evolving along with the development of lighting technology using electricity. New types of light sources such as a sealed beam lamp utilizing a headlamp like a single filament bulb, a halogen lamp using a halogen gas, and a high-intensity discharge (HID) lamp have emerged one after another. A light emitting diode (LED) lamp using light emitting diodes has been spotlighted after the 21st century.

Accordingly, a high-resolution LED market is gradually expanding, and an application for road image projection of a high-resolution LED is gradually expanding. Meanwhile, it is necessary to control a current of the LED and a speed of a fan in order to drive a high-resolution communication lamp. Here, a pulse width modulation (PWM) signal may be necessary to control the LED and the fan. However, as shown in FIG. 1, the PWM signal cannot be transmitted using a conventional image signal transmission line. Therefore, an additional control unit (or a micro controller unit (MCU), for example, a second control unit 11) may be necessary to transmit the PWM signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a lamp system for a vehicle including an optical output unit including a light source drive unit configured to drive a light source unit and a reception unit configured to receive an integrated control signal, and a power supply unit configured to supply power to an electrical load unit and the optical output unit, where one or more processors are configured to execute instructions and a memory storing the instructions, wherein execution of the instructions configures the one or more processors to generate the integrated control signal for controlling one or more of the electrical load unit and the optical output unit and a transmission unit providing the integrated control signal to the reception unit, the integrated control signal includes image data and a power control signal, the reception unit is configured to provide a pulse width modulation (PWM) signal for power control to the power supply unit based on the received integrated control signal, and the power supply unit variably supplies power to the electrical load unit and the light source drive unit based on the PWM signal.

The power control signal may include a virtual PWM signal generated based on a general purpose input/output (GPIO) signal.

The transmission unit may include an image interface configured to receive the image data and the power control signal may be transmitted as a virtual PWM signal by using data from an unused data line among plural lines of the image data input to the image interface.

The processors may be further configured to receive a pixel clock (PCLK) of the image data by using a GPIO port in the processor and synchronize the virtual PWM signal with the image data based on the received PCLK.

The electrical load unit may be a fan, and the power supply unit may control a speed of the fan based on the PWM signal.

The power supply unit may be configured to control a current flowing in the optical output unit based on the PWM signal.

In a general aspect, here is an apparatus including a light source, one or more processors configured to execute instructions, and a memory storing the instructions, wherein execution of the instructions configures the one or more processors to generate integrated control signals for controlling one or more of an electrical load and the light source, the integrated control signals including image data and power control signals and generate a pulse width modulation (PWM) signal to control a power supply based on the integrated control signal, the power supply variably supplying power to the electrical load and a light source drive unit based on the PWM signal.

The electrical load may be a fan configured to cool the light source.

The PWM may be generated to control a speed of the fan.

The apparatus may include an optical output unit including an image signal transmission line, the light source, and the electrical load, the PWM signal may be provided to the optical output unit through the image signal transmission line.

The processors may further be configured to encode the image data and the power control signal into a virtual PWM signal, the virtual PWM signal including a predetermined period and a duty ratio and decode the virtual PWM signal in synchronization with a pixel clock (PCLK) signal of the optical output unit.

In a general aspect, here is provided a display apparatus including a power supply configured to provide power to a lamp, a fan, and an optical output device of the display apparatus, a control unit including processors configured to control operations of the display apparatus, the processors being configure to generate an integrated control signal including image data and power control signals and transmit the integrated control signal to a transmission device, the transmission device transmitting the integrated control signal to a reception device of the optical output device as general purpose input/output (GPIO) signals, and the reception device being configured to decode the GPIO signals into virtual pulse width modulation (PWM) signals, and transmit the virtual PWM signal through unused data lines of an image interface of the display apparatus to provide the image data to an image source drive device of the optical output device and power control signals to the power supply.

The generating of the PWM signs includes a duty ratio of 85%.

The display apparatus may include an image signal transmission line configured to transmit the virtual PWM signal from the processor to the optical output device.

Figure 1:
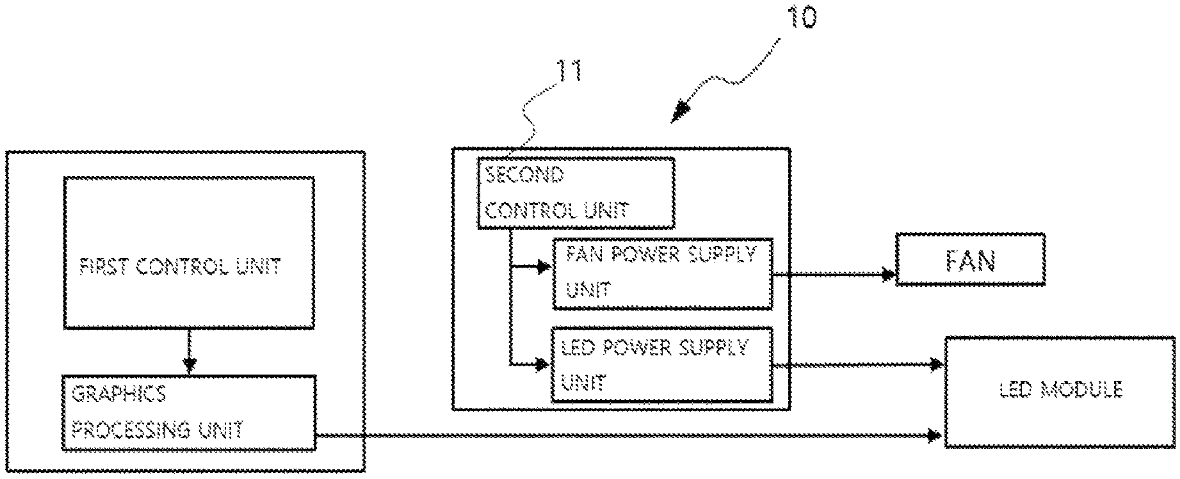
FIG. 1 is a schematic view showing a conventional lamp system for a vehicle.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
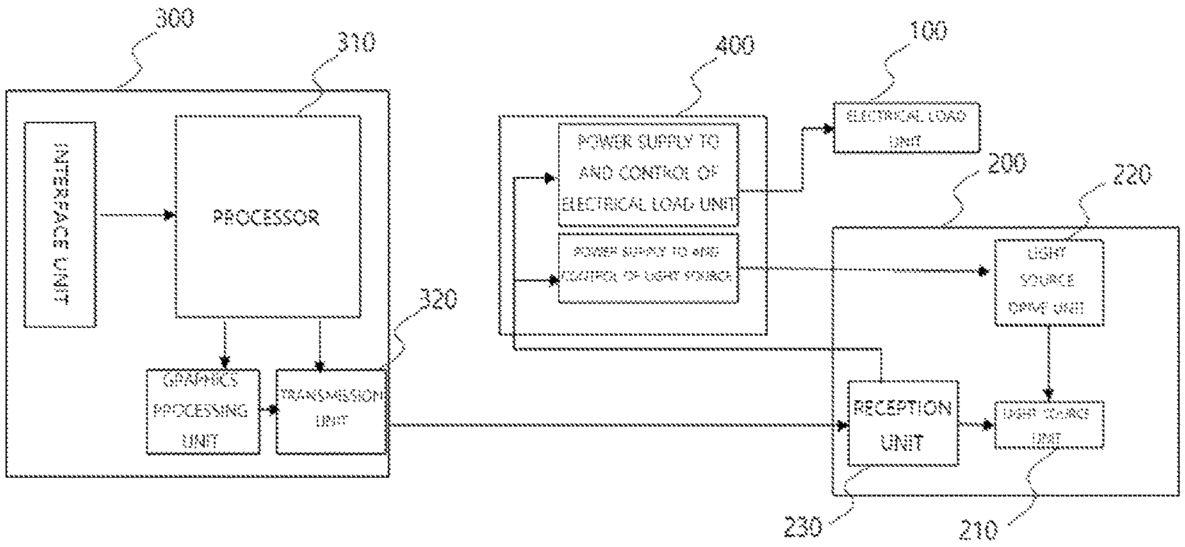
FIG. 2 is a schematic view showing a lamp system for a vehicle according to the present disclosure.

FIG. 2 is a schematic view showing a lamp system for a vehicle according to the present disclosure.

As shown in FIG. 2, a lamp system 1000 for a vehicle according to the present disclosure may include an electrical load unit 100, an optical output unit 200, a control unit 300, and a power supply unit 400.

The electrical load unit 100 may be a component consuming power and may include a fan for example.

The optical output unit 200 may include a light source unit 210 including at least one light source 220, a light source drive unit 220 driving the light source unit 210, and a reception unit 230 receiving an integrated control signal.

The power supply unit 400 may supply power to at least one of the electrical load unit 100 and the optical output unit 200 to operate the electrical load unit 100 or the optical output unit 200.

The control unit 300 may include a processor 310 generating the integrated control signal, and a transmission unit 320 providing the integrated control signal to the reception unit 230, and the control unit 300 may control the electrical load unit 100 and the optical output unit 200 through this configuration.

Here, the control unit 300 may transmit the generated PWM signal through an image signal transmission line (i.e., a line 500) connected to the optical output unit 200.

In detail, the integrated control signal may include image data and a power control signal.

Accordingly, the reception unit 230 may provide the pulse width modulation (PWM) signal for power control to the power supply unit 400 based on the received integrated control signal, and the power supply unit 400 receiving this signal may variably supply power to each of the electrical load unit 100 or the light source drive unit 220 based on the received PWM signal.

Figure 3:
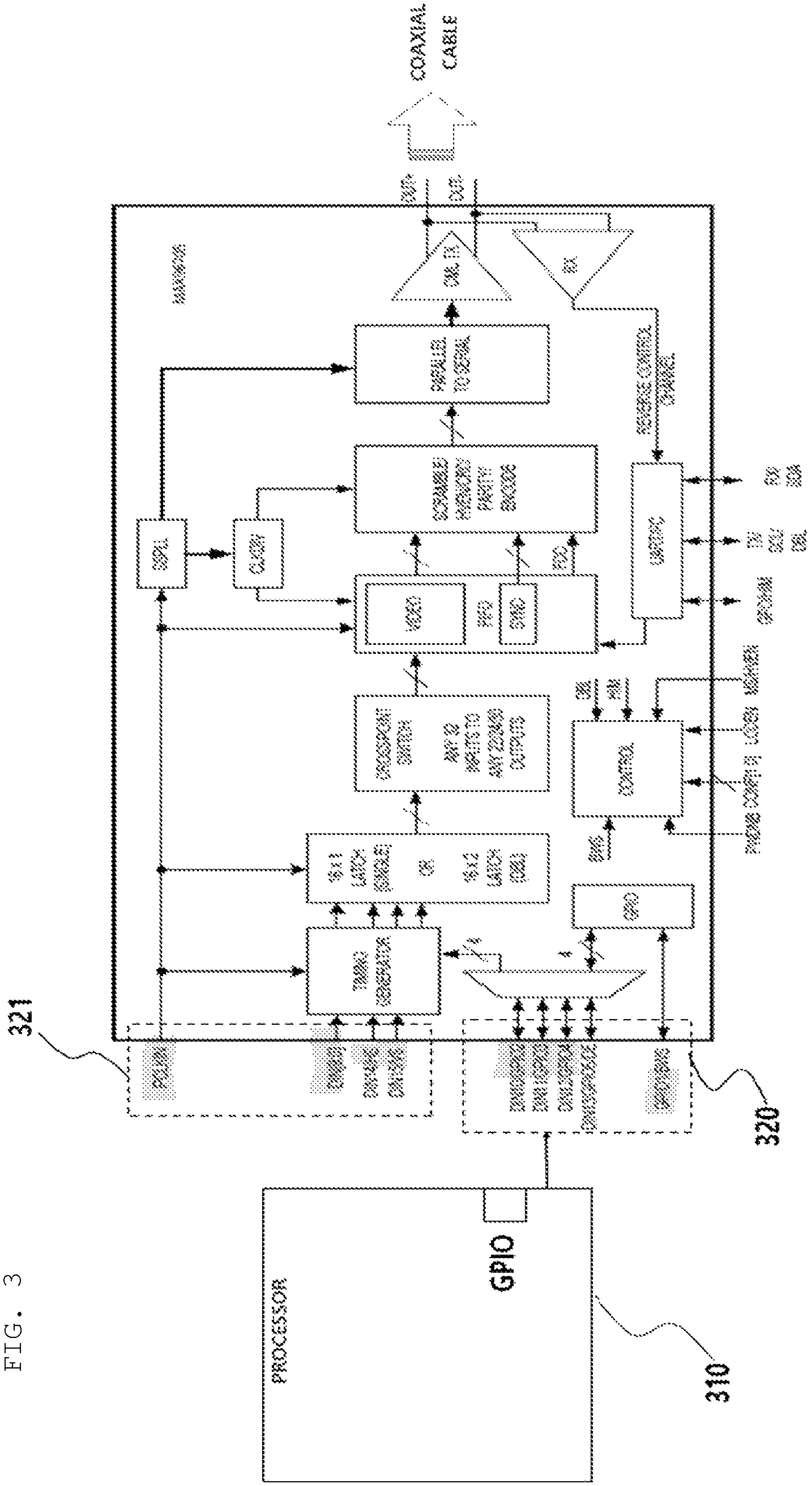
FIG. 3 is a schematic view showing communication between a processor and a transmission unit according to another embodiment of the present disclosure.
Figure 4:
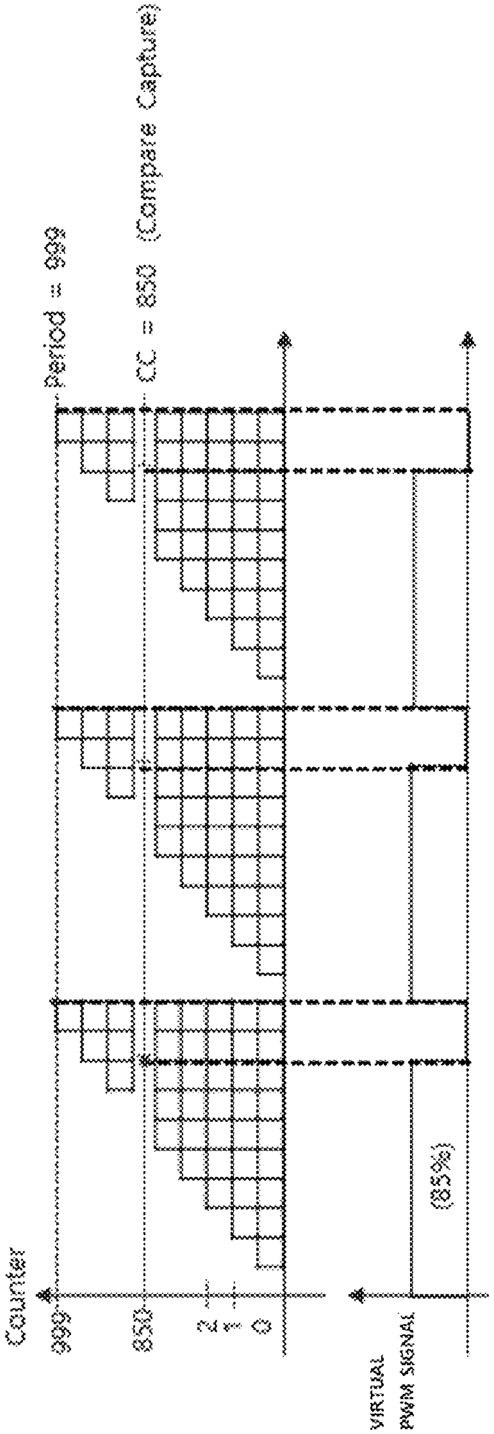
FIG. 4 is a schematic view showing a virtual pulse width modulation (PWM) signal generated according to FIG. 3.

FIG. 3 is a schematic view showing communication between the processor and the transmission unit according to another embodiment of the present disclosure; and FIG. 4 is a schematic view showing a virtual pulse width modulation (PWM) signal generated according to FIG. 3.

First, it is preferable that each of the transmission unit 320 and the reception unit 230 according to the present disclosure are able to perform general purpose input/output (GPIO) signal transmission between communication interfaces.

Accordingly, each of the transmission unit 320 and the reception unit 230 may include a GPIO terminal.

Accordingly, as shown in FIG. 3, the processor 310 in the control unit 300 may generate the virtual PWM signal based on the GPIO signal and transmit the same to the transmission unit 320.

In other words, the power control signal may include the virtual PWM signal.

In detail, the processor 310 may convert the GPIO signal to the virtual PWM signal, which is a signal including a certain period and a duty ratio, and transmit the same. Here, the virtual PWM signal may be generated using a GPIO counter function.

In detail, the period refers to a period for determining how many clocks a timer is to be reset. Here, a counter value of the timer may be increased for every clock, and when this counter value becomes equal to the period, the counter value may be reset to zero. In addition, a high state may be output until this counter value becomes equal to a pulse value. That is, the pulse value refers to a value for determining how many clocks the timer may remain high during the period. Therefore, the duty ratio (%) may be determined by the following equation:

$$(\text{pulse}/\text{period})\times 100.$$

Therefore, as shown in FIG. 4, it may be seen that the output is changed from the high state to a low state when the counter value is 850, and the counter value is reset when the counter is increased to 999. Therefore, when substituted into the above equation, it may be seen that the virtual PWM signal with a duty ratio of 85% is generated.

Figure 5:
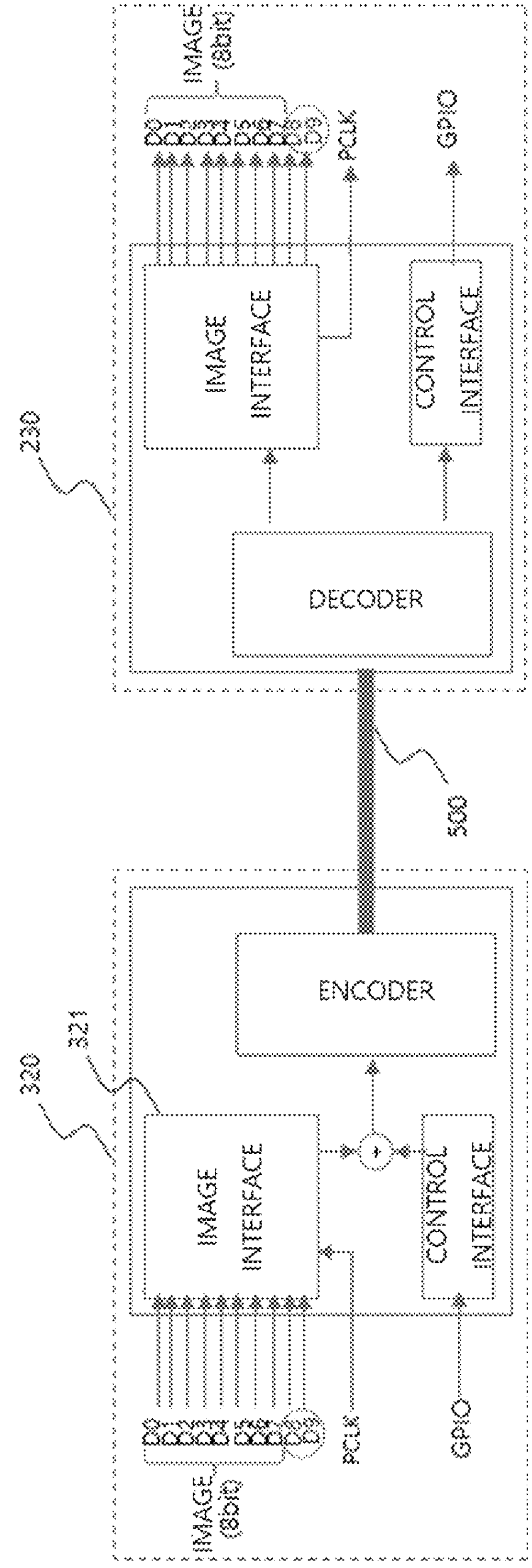
FIG. 5 is a schematic view showing communication between the transmit unit and a reception unit according to another embodiment of the present disclosure.
Figure 6:
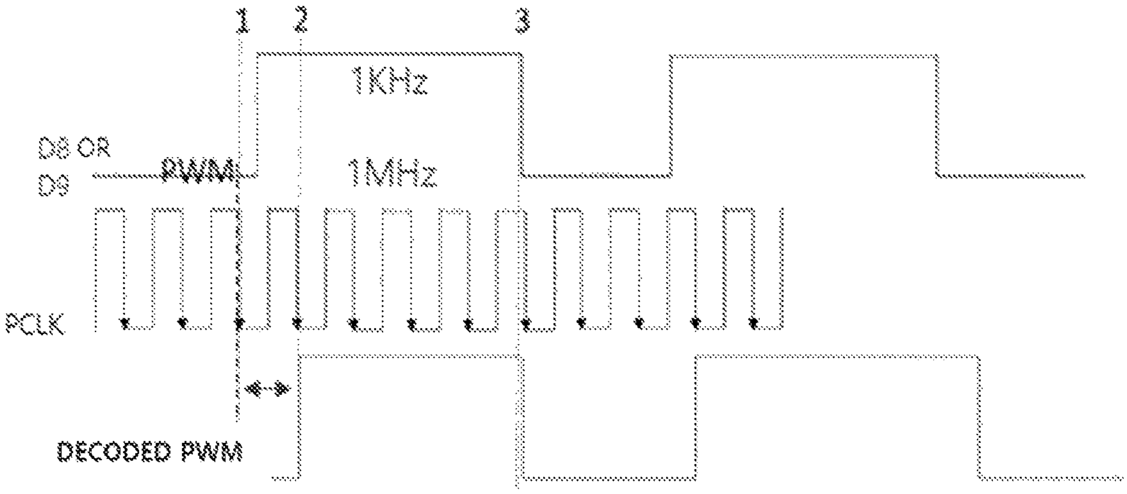
FIG. 6 is a schematic view showing a decoded PWM signal according to FIG. 5.

FIG. 5 is a schematic view showing communication between the transmit unit and the reception unit according to another embodiment of the present disclosure; and FIG. 6 is a schematic view showing a decoded PWM signal according to FIG. 5.

As shown in FIG. 5, the transmission unit 320 may include an image interface 321.

The image interface 321 may receive the image data.

In detail, Referring to FIG. 5, before the transmission unit 320 performs encoding, the control unit 300 may transmit the virtual PWM signal through D8 or D9, which is data from an unused data line among data lines of the image data input to the image interface 321.

In other words, the power control signal may be transmitted as the virtual PWM signal by using the data from the unused data line among the data lines of the image data input to the image interface 321.

Therefore, the transmission unit 320 may perform the encoding on the image data and the virtual PWM signal.

Here, a resolution error may occur because the reception unit 230 receiving the encoded PWM signal decodes the signal based on a pixel clock (PCLK).

In more detail, the slight resolution error may occur because the image data is decoded based on a PCLK period, while the decoded PWM signal is not synchronized with the PCLK as shown in FIG. 6.

Here, the electrical load unit 100 may apply the decoded PWM signal to its control as it is because the slight resolution error is tolerated.

Figure 7:
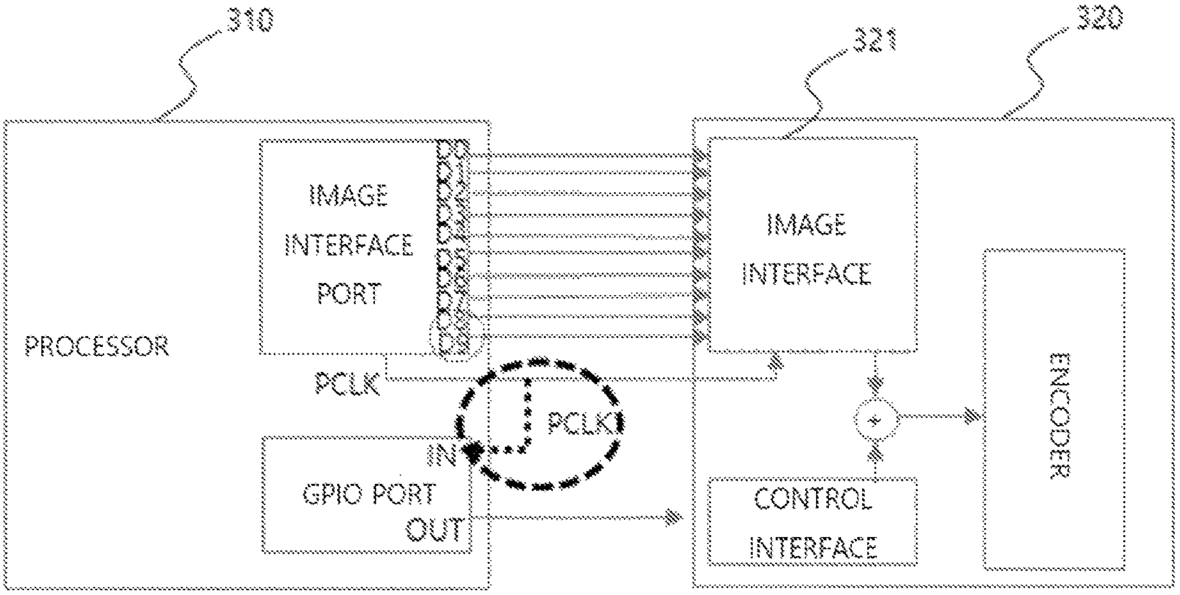
FIG. 7 is a schematic view showing communication between the processor and the transmission unit according to another embodiment of the present disclosure.
Figure 8:
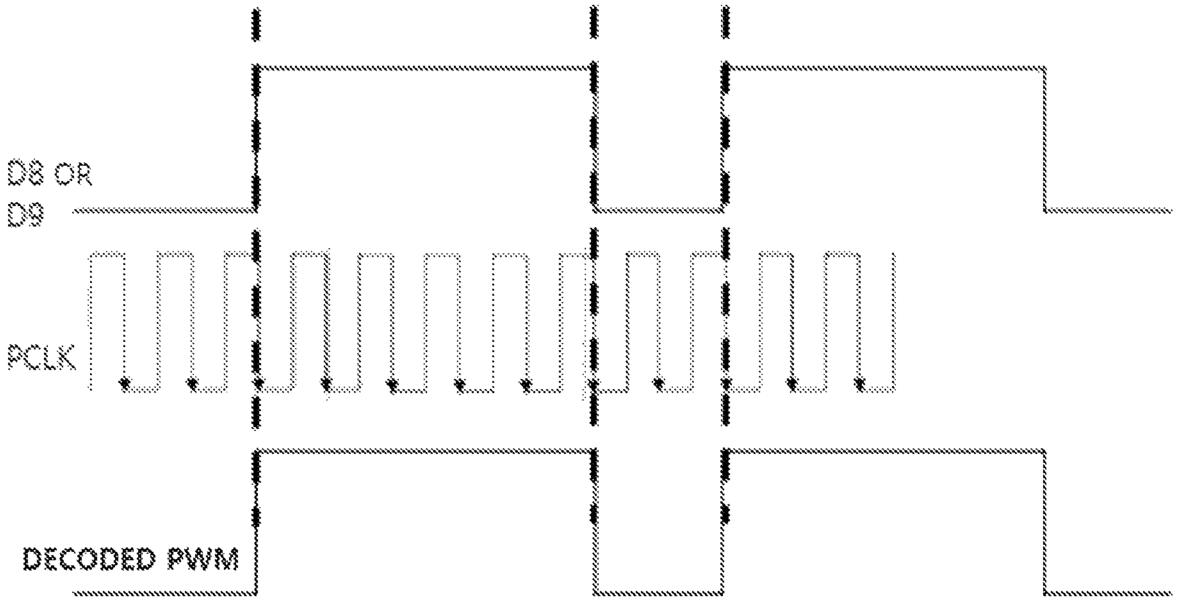
FIG. 8 is a schematic view showing a decoded PWM signal according to FIG. 7.

FIG. 7 is a schematic view showing communication between the processor and the transmission unit according to another embodiment of the present disclosure; and FIG. 8 is a schematic view showing the decoded PWM signal according to FIG. 7.

As shown in FIG. 7, the processor 310 may receive the PCLK of the image data when transmitting the PWM signal through D8 or D9, which is the data from the unused data line among the data lines of the image signal input to the image interface 321.

Here, the processor 310 may receive the PCLK by using a GPIO port in the processor 310, and synchronize the virtual PWM signal with the image data based thereon.

Accordingly, as shown in FIG. 8, it may be seen that the PWM signal is synchronized with the PLCK, thus resolving the occurrence of the resolution error shown in FIG. 6.

Figure 9:
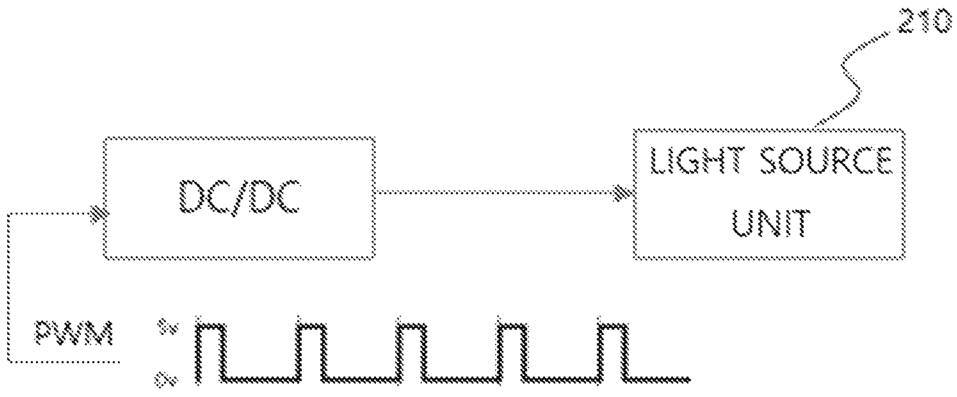
FIG. 9 is a schematic view showing a process of controlling a light source unit by using the PWM signal.
Figure 10:
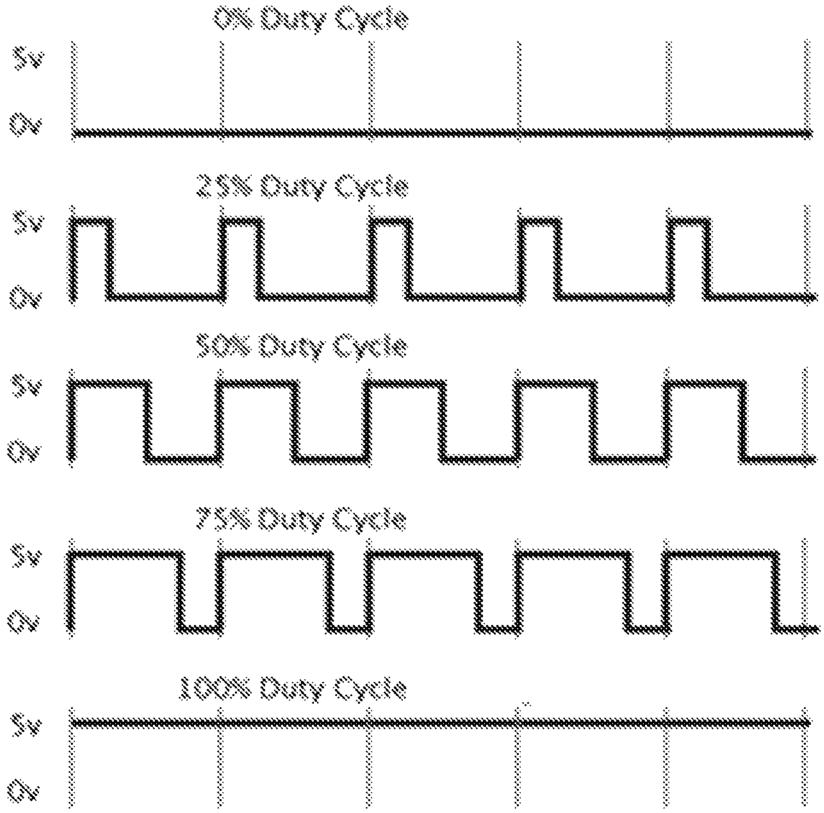
FIG. 10 is a schematic view showing current reduction according to FIG. 9.

FIG. 9 is a schematic view showing a process of controlling the light source unit by using the PWM signal; and FIG. 10 is a schematic view showing current reduction according to FIG. 9.

As shown in FIG. 9, the power supply unit 400 may control a current flowing in the light source unit 210 based on the PWM signal decoded by the reception unit 230.

In detail, as shown in FIG. 10, a duty ratio of 100% included in the PWM signal may reduce the current by zero %, a duty ratio of 75% may reduce the current by 25%, and a duty ratio of 50% may reduce the current by 50%.

Therefore, referring back to FIG. 9, the current flowing in the light source unit 210 may be reduced by 75% through the PWM signal including a duty ratio of 25%.

Figure 11:
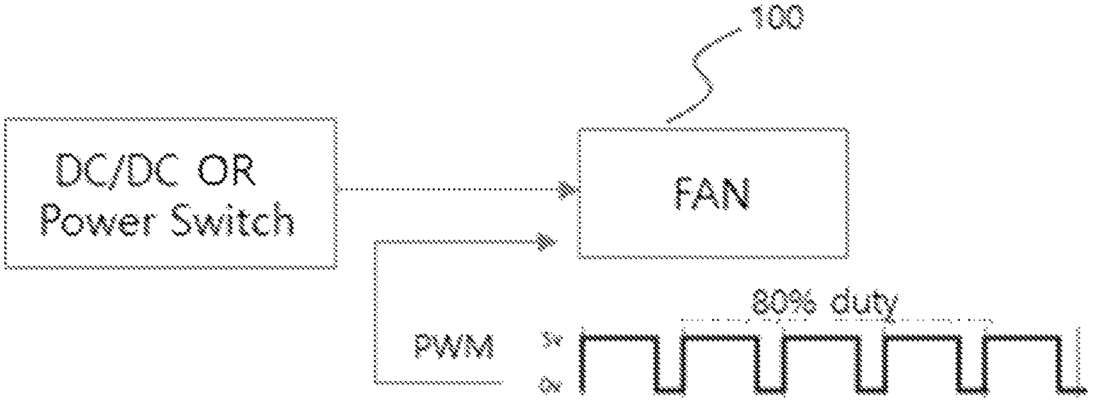
FIG. 11 is a schematic view showing a process of controlling a fan by using the PWM signal.
Figure 12:
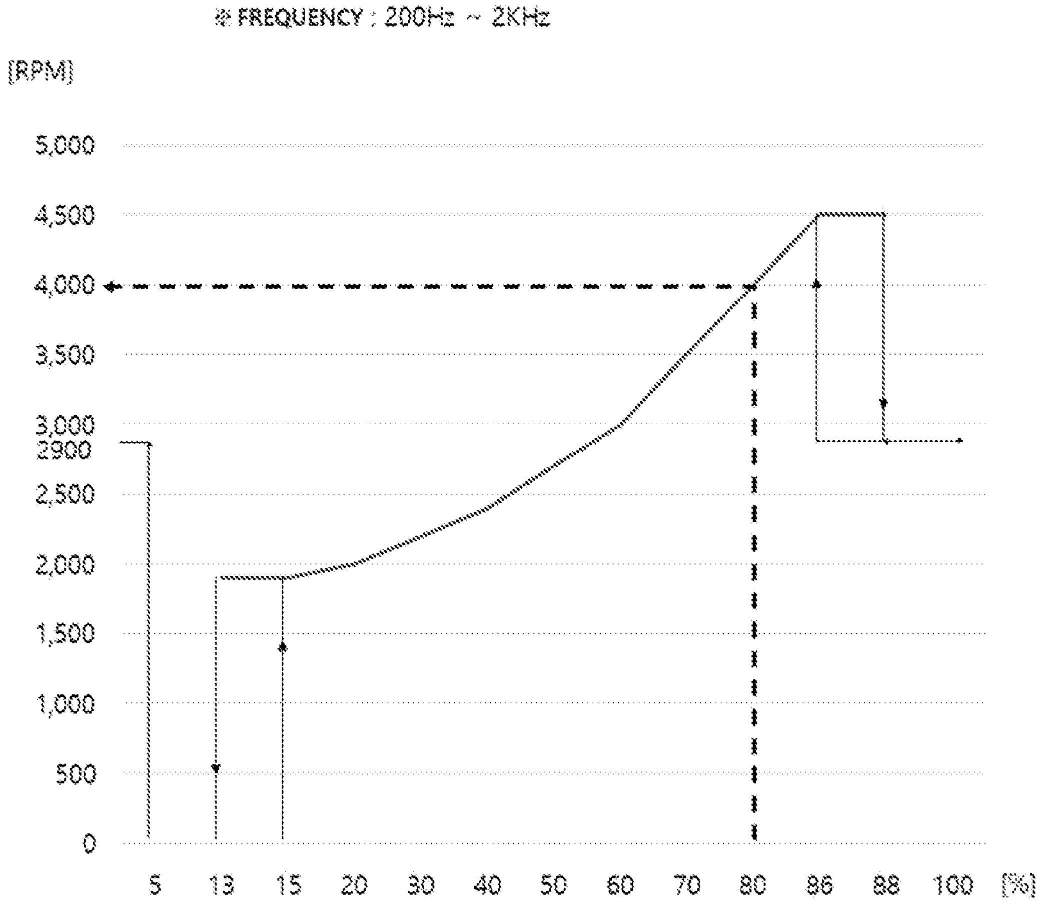
FIG. 12 is a graph showing a relationship between the duty ratio and revolutions per minute (RPM) of an electrical load unit.

FIG. 11 is a schematic view showing a process of controlling the electrical load unit by using the PWM signal; and FIG. 12 is a graph showing a relationship between the duty ratio and revolutions per minute (RPM) of the electrical load unit.

The power supply unit 400 may control a RPM speed of the fan 100 based on the PWM signal decoded by the reception unit 230.

Therefore, as shown in FIG. 12, the speed of the electrical load unit 100 may be controlled to 4000 RPM through the PWM signal including a duty ratio of 80%.

As set forth above, the lamp system for a vehicle according to the various embodiments of the present disclosure as described above may reduce material costs by using an optimal control interface.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp system for a vehicle, the system comprising:

an optical output unit comprising:

a light source drive unit configured to drive a light source unit; and a reception unit configured to receive an integrated control signal;

a power supply unit configured to supply power to an electrical load unit and the optical output unit;

a memory for storing instructions;

a single processor, upon execution of the instructions, is configured to generate the integrated control signal for controlling the electrical load unit and the optical output unit; and a transmission unit configured to provide the integrated control signal to the reception unit, wherein the integrated control signal includes image data and a power control signal, wherein the reception unit is further configured to provide a pulse width modulation (PWM) signal for power control to the power supply unit based on the integrated control signal received from the transmission unit, wherein the power supply unit variably supplies power to the electrical load unit and the light source drive unit based on the PWM signal, wherein the transmission unit comprises an image interface configured to receive the image data, and wherein the power control signal is transmitted as a virtual PWM signal by using data from an unused data line among plural lines of the image data input to the image interface.

2. The system of claim 1, wherein the power control signal includes a virtual PWM signal that is generated based on a general purpose input/output (GPIO) signal.

3. The system of claim 1, wherein the processor is further configured to:

receive a pixel clock (PCLK) of the image data by using a GPIO port in the processor; and synchronize the virtual PWM signal with the image data based on the received PCLK.

4. The system of claim 1, wherein the electrical load unit comprises a fan, and wherein the power supply unit controls a speed of the fan based on the PWM signal.

5. The system of claim 1, wherein the power supply unit is configured to control a current flowing in the optical output unit based on the PWM signal.

6. An apparatus, comprising:

a light source;

a power supply unit;

a light source drive unit;

an optical output unit comprising an image signal transmission line, the light source, and an electrical load;

a memory for storing instructions; and a single processor, upon execution of the instructions, is configured to:

generate integrated control signals for controlling the electrical load and the light source, the integrated control signals including image data and power control signals; and control the power supply unit to generate a pulse width modulation (PWM) signal to control a power supply based on the integrated control signal, wherein the power supply unit is configured to variably supply power to the electrical load and the light source drive unit based on the PWM signal, and wherein the PWM signal is provided to the optical output unit through the image signal transmission line.

7. The apparatus of claim 6, wherein the electrical load comprises a fan configured to cool the light source.

8. The apparatus of claim 7, wherein the PWM is generated to control a speed of the fan.

9. The apparatus of claim 6, wherein the one or more processor is further configured to:

encode the image data and the power control signal into a virtual PWM signal, the virtual PWM signal including a predetermined period and a duty ratio; and decode the virtual PWM signal in synchronization with a pixel clock (PCLK) signal of the optical output unit.

10. A display apparatus, comprising:

a power supply configured to provide power to a lamp, a fan, and an optical output device of the display apparatus;

a control unit comprising one or more processors configured to control operations of the display apparatus, wherein the one or more processors are configured to:

generate an integrated control signal including image data and power control signals; and transmit the integrated control signal to a transmission device, the transmission device transmitting the integrated control signal to a reception device of the optical output device as general purpose input/output (GPIO) signals, and wherein the reception device is configured to:

decode the GPIO signals into virtual pulse width modulation (PWM) signals; and transmit the virtual PWM signal through unused data lines of an image interface of the display apparatus to provide the image data to an image source drive device of the optical output device and power control signals to the power supply.

11. The display apparatus of claim 10, wherein the generating of the PWM signs includes a duty ratio of 85%.

12. The display apparatus of claim 10, further comprising:

an image signal transmission line configured to transmit the virtual PWM signal from the one or more processors to the optical output device.

* * * * *